May 21, 1935.　　　G. W. HALL ET AL　　　2,001,959

HOOK

Filed June 29, 1934

Inventors
GEORGE W. HALL.
CHAUNCEY C. BARTON.

By Louis V. Lucia
Attorney

Patented May 21, 1935

2,001,959

UNITED STATES PATENT OFFICE 2,001,959

HOOK

George W. Hall, Moodus, and Chauncey C. Barton, Wethersfield, Conn.

Application June 29, 1934, Serial No. 733,002

7 Claims. (Cl. 24—236)

Our invention relates to that class of hooks, commonly known as snap hooks, in which a retaining member such as a spring is provided for preventing the disengagement of said hook from a member to which it is attached.

Hooks of this type are especially adaptable for use in connection with chains, such as antiskid for automobiles, and when used on such devices it is especially desirable to have these hooks as short as possible and still have them so that the chain can be easily disengaged therefrom with one hand and without the necessity of using the thumb to force down the retaining member; such as now necessary on hooks of this type in common use from which it is very difficult to remove the chains, due to the fact that this has to be done generally in cold weather when the operator's hands are cold and, therefore, the hooks cannot be readily manipulated.

An object of our invention is to provide a hook of the character described into which a member, such as a chain link, may be easily snapped and when desired, disengaged therefrom by a simple operation without the necessity of operating the retaining member of said hook.

A further object of our invention is to provide such a hook which can be made extremely short in length and still be easily operatable for the engagement of a member therein and the disengagement of said member therefrom.

A further object of our invention is to provide a connecting hook which can be economically constructed and which is durable as well as simple to manufacture.

Figure 1:
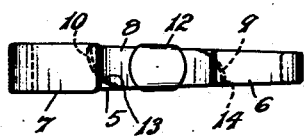
Figure 1 is a plan view of our improved hook.
Figure 2:
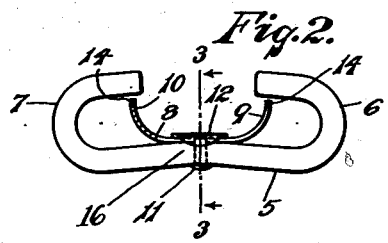
Figure 2 is a side view of the same.
Figure 3:
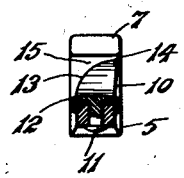
Figure 3 is a view in cross section on line 3—3 of Figure 2.

In said drawing, our invention is shown as constructed in the form of a double hook from the bar 5 which is blanked from a piece of sheet metal. The said bar is bent over at each end to provide hook portions 6 and 7 separated by a shank portion 16. The hook portion 7 being preferably wider than the portion 6 in order to conform substantially to the form of anti-skid chains, wherein the hook 7 is engaged with the circumferential chain member and the hook 6 with the cross chain member of the said chains.

The retaining member 8 is provided in the form of a flat spring having ends 9 and 10 positioned respectively with relation to the hooks 6 and 7, and said member is secured to the shank 16 by means of a rivet 11 which has a head 12 that is adapted to overlap the sides of the retaining member 8 and the shank 16 so as to prevent displacement of said member 8 by rotation on said shank. This rivet extends thru a hole in the retaining member and the head of said rivet is made sufficiently large in order to cover a substantial portion of the area around said hole and thus prevent breakage which has been found very likely to occur at the center of said retaining member when they are otherwise fastened.

It will be noted that the ends of the springs 9 and 10 extend to a position a substantial distance inside of the end of the hooks thus forming an overlying hook arrangement. This is to provide for the easy engagement of a member in the hook; which can be accomplished by simply hooking such member on to that portion of the hook between its end and the retaining spring and then pulling on the member to force it past the retaining spring and into the hook.

Figure 4:
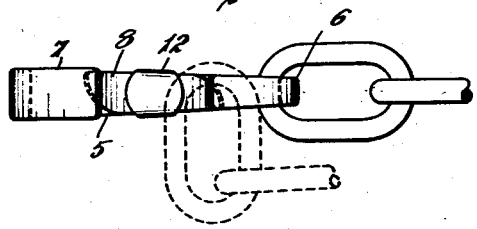
Figure 4 is a plan view of the same illustrating the use of our hook and as attached to a chain.

The said retaining springs are curved towards the end of the overlying hooks and are also tapered, as at 13 to a point 14 at one side of the spring which forms a cam surface, to provide a wedge shaped passage 15 for permitting the link to be easily disengaged from the hook by simply twisting the link to a crosswise direction with respect to the hook, as illustrated in Figure 4 of the drawing, and pulling side ways on the link thus wedging the spring downwardly and permitting passage of the link thru the passage 15.

It can be readily seen from the above description that, by their invention, applicants have provided a hook having a flat retaining spring member with its free end forming a cam by means of which the said retaining spring is forced away from the hook and towards the shank by a simple transverse movement of a link member.

We claim:

1. A hook of the character described for the interconnecting of link members comprising a shank portion, a retaining member comprising a longitudinally extending spring mounted on said shank portion and curved to extend with the end thereof in rear relation to the end of said hook, the said extending portion having its free end formed to provide a cam portion transversely disposed with respect to said retaining member whereby said member will be forced in a direction towards said shank portion upon the movement of a link member across said cam portion.

2. In combination with a hook of the character described comprising a shank portion; a longitudinally extending retaining member comprising a spring secured on said shank portion and having its end extending substantially perpendicularly towards and near the end of said hook, the free end of said spring being formed to provide a transverse flared passage between the same and the end of said hook whereby, upon movement of a member thru said passage, contact between said member and said free end will cause movement of said spring in a direction away from the end of said hook and towards said shank portion.

3. A hook of the character described comprising a shank portion, a retaining member comprising a spring having its end curved upwardly from said shank portion towards the end of said hook and extending partly within said hook and in near relation with the end thereof, the free end of said spring being formed to provide a transverse flared passage between the same and the end of said hook.

4. In combination with a hook of the character described comprising a shank portion, a retaining member comprising a thin elongated bar of spring material having its end formed at an angle and curved in a direction towards the end of said hook; said retaining member being rigidly secured to said shank portion in a manner whereby the free end thereof will be disposed in substantially close relation to the end of said hook.

5. A fastening device of the character described comprising a shank portion, a spring retaining member rigidly secured to said shank portion and curved upwardly therefrom; and an overlying hook portion spaced from the free end of said member, the edge of said free end disposed diagonally to said member whereby a flared passage is formed between said overlying hook portion and said member.

6. A fastening device of the character described, comprising a shank portion, a spring retaining member rigidly secured to said shank portion having a free end curved upwardly therefrom, a hook overlying the free end of said member and spaced therefrom, the edge of said free end being formed to provide a cam portion transversely disposed with relation to said retaining member.

7. A device of the character described comprising a shank portion, having a hook formed at each end thereof, a retaining member comprising a spring having the edge of the free ends thereof forming a cam portion; the said ends being curved upwardly from said shank portion and extending partly within said hooks and substantially close thereto with the edges thereof transversely disposed with relation to said retaining member.

GEORGE W. HALL.
CHAUNCEY C. BARTON.